US012359292B2

(12) United States Patent
Yamasaki et al.

(10) Patent No.: US 12,359,292 B2
(45) Date of Patent: Jul. 15, 2025

(54) ROD-SHAPED ELECTROMAGNETIC STAINLESS STEEL MATERIAL

(71) Applicant: NIPPON STEEL Stainless Steel Corporation, Tokyo (JP)

(72) Inventors: Shota Yamasaki, Tokyo (JP); Kohji Takano, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 393 days.

(21) Appl. No.: 17/800,846

(22) PCT Filed: Feb. 12, 2021

(86) PCT No.: PCT/JP2021/005231
§ 371 (c)(1),
(2) Date: Aug. 18, 2022

(87) PCT Pub. No.: WO2021/166797
PCT Pub. Date: Aug. 26, 2021

(65) Prior Publication Data

US 2023/0085558 A1 Mar. 16, 2023

(30) Foreign Application Priority Data

Feb. 19, 2020 (JP) ................................ 2020-026141

(51) Int. Cl.

| | |
|---|---|
| ***C22C 38/58*** | (2006.01) |
| ***C22C 38/00*** | (2006.01) |
| ***C22C 38/06*** | (2006.01) |
| ***C22C 38/34*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***H01F 1/147*** | (2006.01) |
| *C21D 6/00* | (2006.01) |
| *C21D 8/06* | (2006.01) |
| *C21D 9/52* | (2006.01) |

(52) U.S. Cl.

CPC ............ *C22C 38/58* (2013.01); *C22C 38/001* (2013.01); *C22C 38/002* (2013.01); *C22C 38/004* (2013.01); *C22C 38/005* (2013.01); *C22C 38/008* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *H01F 1/14766* (2013.01); *C21D 6/004* (2013.01); *C21D 6/005* (2013.01); *C21D 6/007* (2013.01); *C21D 6/008* (2013.01); *C21D 8/06* (2013.01); *C21D 9/525* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 2003/0121575 A1 | 7/2003 | Bourgin et al. | |
| 2009/0020189 A1 | 1/2009 | Yoshihara et al. | |
| 2015/0225806 A1 | 8/2015 | Takano et al. | |
| 2016/0012947 A1 | 1/2016 | Masumoto | |
| 2017/0162306 A1 | 6/2017 | Masumoto et al. | |
| 2018/0023158 A1 | 1/2018 | Sasaki et al. | |
| 2018/0073115 A1 | 3/2018 | Hayashida et al. | |
| 2019/0390303 A1 | 12/2019 | Tokuda et al. | |

FOREIGN PATENT DOCUMENTS

| | | | |
|---|---|---|---|
| CN | 101285152 A | * 10/2008 | .......... C22C 38/001 |
| CN | 105492644 A | 4/2016 | |
| EP | 3 260 564 A1 | 12/2017 | |
| JP | 5-329510 A | 12/1993 | |
| JP | 6-049605 A | 2/1994 | |

(Continued)

OTHER PUBLICATIONS

International Search Report (PCT/ISA/210) issued in PCT/JP2021/005231, dated Apr. 27, 2021.
Office Action issued in Taiwanese Patent Application No. 110105541 dated Jun. 30, 2021.
English translation of the International Preliminary Report on Patentability for International Application No. PCT/JP2021/005231, dated Jan. 11, 2022.
"Stainless steel," Britannica Online Encyclopedia, 2022, URL: <https://www.britannica.com/technology/stainless-steel>.
Anonymous, "Steel ball skew rolling mill-Steel ball rolling production line", XP055971550, Mar. 31, 2019 [retrieved on Oct. 14, 2022], URL: <http//www.steelballmachine.com/solution/xiezhaji.html>.

(Continued)

*Primary Examiner* — Jenny R Wu
(74) *Attorney, Agent, or Firm* — Birch, Stewart, Kolasch & Birch, LLP

(57) ABSTRACT

A bar-shaped stainless steel product contains, by mass %, 0.001 to 0.030% of C, 0.01 to 4.00% of Si, 0.01 to 2.00% of Mn, 0.01 to 4.00% of Ni, 6.0 to 35.0% of Cr, 0.01 to 5.00% of Mo, 0.01 to 2.00% of Cu, and 0.001 to 0.050% of N. In the product, an F value is 20 or less, a rolling-direction-crystal-orientation RD//<100> fraction is 0.05 or more, and preferably a rolling-direction-crystal-orientation RD//<334> fraction is 0.2 or less. The above RD//<100> fraction means an area ratio of crystal having 25 degrees or less of an orientation difference between a <100> orientation and a rolling direction, and the above RD//<334> fraction means an area ratio of crystal having 10 degrees or less of an orientation difference between a <334> orientation and a rolling direction. F value=700C+800N+20Ni+10Cu+10Mn−6.2Cr−9.2Si−9.3Mo−74.4Ti−37.2Al−3.1Nb+63.2.

11 Claims, No Drawings

(56) References Cited

FOREIGN PATENT DOCUMENTS

| | | | | |
|---|---|---|---|---|
| JP | 6-049606 | A | 2/1994 | |
| JP | 2002-254103 | A | 9/2002 | |
| JP | 2003-213382 | A | 7/2003 | |
| JP | 2004-307979 | A | 11/2004 | |
| JP | 2005-68490 | A | 3/2005 | |
| JP | 2005-226147 | A | 8/2005 | |
| JP | 2005-313207 | A | 11/2005 | |
| JP | 2007-107073 | A | 4/2007 | |
| JP | 2012-201929 | A | 10/2012 | |
| JP | 2013-147705 | A | 8/2013 | |
| JP | 2013-185183 | A | 9/2013 | |
| JP | 5344454 | B2 | 11/2013 | |
| JP | 2014-80684 | A | 5/2014 | |
| JP | 2015-224358 | A | 12/2015 | |
| JP | 2018-119174 | A | 8/2018 | |
| TW | 201504458 | A | 2/2015 | |
| TW | 201540846 | A | 11/2015 | |
| TW | 201702402 | A | 1/2017 | |
| TW | 201831708 | A | 9/2018 | |
| WO | WO 2014/157231 | A1 | 10/2014 | |
| WO | WO-2015190422 | A1 * | 12/2015 | ............... C21D 8/06 |
| WO | WO 2016/031958 | A1 | 3/2016 | |
| WO | WO 2016/132403 | A1 | 8/2016 | |
| WO | WO 2020/196595 | A1 | 10/2020 | |

OTHER PUBLICATIONS

Indian Office Action for Indian Application No. 202117045856, dated Mar. 14, 2022, with an English translation.

International Preliminary Report on Patentability, dated Sep. 28, 2021, and English translation of the Written Opinion of the International Searching Authority, dated Jun. 16, 2022, for International Application No. PCT/JP2020/013242.

International Search Report for International Application No. PCT/JP2020/013242, dated Jun. 16, 2020, with an English translation.

U.S. Office Action for U.S. Appl. No. 17/442,986, dated Aug. 14, 2024.

U.S. Office Action for U.S. Appl. No. 17/442,986, dated Aug. 23, 2023.

U.S. Office Action for U.S. Appl. No. 17/442,986, dated Feb. 7, 2023.

U.S. Office Action for U.S. Appl. No. 17/442,986, dated Jul. 15, 2022.

Written Opinion of the International Searching Authority for International Application No. PCT/JP2020/013242, dated Jun. 16, 2020.

* cited by examiner

ROD-SHAPED ELECTROMAGNETIC STAINLESS STEEL MATERIAL

TECHNICAL FIELD

The present invention relates to a bar-shaped electromagnetic stainless steel product, in particular, a bar-shaped stainless steel product having excellent soft magnetic properties and an electromagnetic component using the same.

BACKGROUND ART

Electromagnetic stainless steel products, as represented by solenoid valves, have been conventionally produced through processing, forming, and heat treatment by using, as a material, a ferritic stainless steel wire rod or steel wire, which are exemplified by SUS430 and SUS410L. However, such stainless steel products processed and manufactured from the above ferritic stainless steel wire rod have insufficient soft magnetic properties for use in high-precision/high-powered components, resulting in limited uses. In order to solve the above problem, a technique of optimizing alloy elements, such as Cr, Si, and Al, has been studied for the purpose of improving the soft magnetic properties (see, Patent Literatures 1 to 3). No invention so far focuses attention on the improvement in the soft magnetic properties of ferritic stainless steel bars and wire rods through texture control based on a combination of constituents and processes.

CITATION LIST

Patent Literature(s)

Patent Literature 1: JP 06-49606 A
Patent Literature 2: JP 06-49605 A
Patent Literature 3: JP 2004-307979 A
Patent Literature 4: JP 05-329510 A

SUMMARY OF THE INVENTION

Problem(s) to be Solved by the Invention

In view of the above, an object of the invention is to solve the above problem and provide a bar-shaped stainless steel product having excellent soft magnetic properties and an electromagnetic component using the same.

Means for Solving the Problems

The invention is made to solve the above problem, and provides a bar-shaped stainless steel product and an electromagnetic component below as a gist.

[1] A bar-shaped stainless steel product of a chemical composition including: by mass %, 0.001 to 0.030% of C, 0.01 to 4.00% of Si, 0.01 to 2.00% of Mn, 0.01 to 4.00% of Ni, 6.0 to 35.0% of Cr, 0.01 to 5.00% of Mo, 0.01 to 2.00% of Cu, 0.001 to 0.050% of N, 0 to 2.00% of Ti, 0 to 2.00% of Nb, 0 to 2.0% of V, 0 to 0.1% of B, 0 to 7.000% of Al, 0 to 3.0% of W, 0 to 0.05% of Ga, 0 to 2.5% of Co, 0 to 2.5% of Sn, 0 to 2.5% of Sb, 0 to 2.5% of Ta, 0 to 0.05% of Ca, 0 to 0.012% of Mg, 0 to 0.012% of Zr, 0 to 0.05% of REM, 0 to 0.30% of Pb, 0 to 0.80% of Se, 0 to 0.30% of Te, 0 to 0.50% of Bi, 0 to 0.50% of S, and 0 to 0.30% of P, a balance consisting of Fe and impurities, an F value shown in Formula (a) below being 20.0 or less, a rolling-direction-crystal-orientation RD//<100> fraction of the bar-shaped stainless steel product being 0.05 or more, the rolling-direction-crystal-orientation RD//<100> fraction meaning an area ratio of crystal having 25 degrees or less of an orientation difference between a <100> orientation and a rolling direction, $$F\text{ value}=700C+800N+20Ni+10Cu+10Mn-6.2Cr-9.2Si-9.3Mo-74.4Ti-37.2Al-3.1Nb+63.2 \quad (a)$$

where symbols of elements in Formula (a) mean contents (mass %) of the respective elements in steel.

[2] The bar-shaped stainless steel product according to [1], in which a rolling-direction-crystal-orientation RD//<334> fraction is 0.2 or less at a position having a depth of ⅛ a steel product diameter from a surface of the steel product, the rolling-direction-crystal-orientation RD//<334> fraction meaning an area ratio of crystal having 10 degrees or less of an orientation difference between a <334> orientation and a rolling direction.

[3] The bar-shaped stainless steel product according to [1] or [2], in which the chemical composition further includes, by mass %, at least one selected from 0.001 to 2.00% of Ti, 0.001 to 2.00% of Nb, 0.001 to 2.0% of V, 0.0001 to 0.1% of B, 0.001 to 7.000% of Al, 0.05 to 3.0% of W, 0.0004 to 0.05% of Ga, 0.05 to 2.5% of Co, 0.01 to 2.5% of Sn, 0.01 to 2.5% of Sb, and 0.01 to 2.5% of Ta.

[4] The bar-shaped stainless steel product according to any one of [1] to [3], in which the chemical composition further includes, by mass %, at least one selected from 0.0002 to 0.05% of Ca, 0.0002 to 0.012% of Mg, 0.0002 to 0.012% of Zr, and 0.0002 to 0.05% of REM.

[5] The bar-shaped stainless steel product according to any one of [1] to [4], in which the chemical composition further includes, by mass %, at least one selected from 0.0001 to 0.30% of Pb, 0.0001 to 0.80% of Se, 0.0001 to 0.30% of Te, 0.0001 to 0.50% of Bi, 0.0001 to 0.50% of S, and 0.0001 to 0.30% of P.

[6] The bar-shaped stainless steel product according to any one of [1] to [5], having a magnetic flux density of 0.10 T or more at 5 Oe.

[7] The bar-shaped stainless steel product according to any one of [1] to [6], having a maximum magnetic flux density of 0.05 T or more at 10 Oe and at an alternating current frequency of 2 kHz.

[8] An electromagnetic component using the bar-shaped stainless steel product according to any one of [1] to [7].

According to the above aspects of the invention, a bar-shaped stainless steel product having excellent soft magnetic properties and an electromagnetic component can be provided.

DESCRIPTION OF EMBODIMENT(S)

The inventors widely studied to obtain a bar-shaped stainless steel product having excellent soft magnetic properties and an electromagnetic component. As a result, the following findings (a) to (c) have been obtained.

(a) A crystal orientation RD//<100> fraction in a wire-rod rolling direction can be increased by a combination between ferritic stainless steel and a hot-rolling process (skew rolling time). Further, a crystal orientation RD//<334> fraction in the wire-rod rolling direction can be decreased in a portion from a surface of the wire rod to a position at a depth of ¼ a wire-rod diameter.

(b) A crystal orientation RD//<100> fraction in a steel-wire rolling direction can be increased by a combination between the wire rod and a secondary working process (heat treatment temperature for wire rod, wire drawing rate, and heat treatment temperature for steel wire). Further, a crystal orientation RD//<334> fraction in the steel-wire rolling direction can be decreased in a portion from a surface of the steel wire to a position at a depth of ¼ a steel-wire diameter.

(c) As a result, a magnetic flux density is 0.10 T or more at 5 Oe, and a maximum magnetic flux density is 0.05 T or more at 2 kHz and 10 Oe. The improvement in soft magnetic properties has been found.

The invention has been made on the basis of the above findings. A preferable exemplary embodiment of the invention will be described in detail. In the following description, the preferable exemplary embodiment of the invention will be described as the invention. Requirements of the invention will be described in detail below. Regarding steel products having a bar-shape according to the invention, a product subjected to hot working and left as it is referred to as a "steel bar" and "wire rod", a product subjected to cold working such as wire drawing is referred to as a "steel wire", and the "steel bar", "wire rod" and "steel wire" are collectively referred to as a "bar-shaped steel product".

1. Rolling-Direction-Crystal-Orientation RD//<100> Fraction

In a bar-shaped steel product according to the invention, a crystal orientation in a rolling direction (RD) is controlled. Specifically, a rolling-direction-crystal-orientation RD//<100> fraction (area ratio) (hereinafter, simply referred to as "RD//<100> fraction") is defined at 0.05 or more. This is because soft magnetic properties are reduced at a RD//<100> fraction of less than 0.05. The RD//<100> fraction is more preferably 0.10 or more, further preferably 0.20 or more, and still further preferably 0.40 or more.

The RD//<100> fraction is calculated according to the following procedure. Specifically, the RD//<100> fraction is obtained by measuring at least one field of view at 200-fold magnification at each of a surface layer portion, a center portion, and a ¼-depth-position existing between the surface layer portion and the center portion in an L-cross section of the bar-shaped steel product (i.e., a cross section parallel to a longitudinal direction of the steel product). A crystal orientation of each crystal grain in the observed field(s) of view is analyzed using FE-SEM/EBSD. A rolling direction is represented by RD. A crystal plane in the RD direction is analyzed. Components in a <100> orientation only in a clearance of 25 degrees or less are displayed and the RD//<100> fraction is measured. The surface layer portion refers to a position at a 1-mm depth in a central axial direction from a surface of the steel product. Specifically, the rolling-direction-crystal-orientation RD//<100> fraction means an area ratio of crystal having 25 degrees or less of an orientation difference between the <100> orientation and the rolling direction (a mean of the surface layer portion, the center portion, and the ¼-depth-position).

2. Rolling-Direction-Crystal-Orientation RD//<334> Fraction

In a bar-shaped steel product according to the invention, a crystal orientation deteriorating soft magnetic properties in the rolling direction (RD) is preferably controlled. The crystal orientation RD//<334> fraction in a rolling direction of a steel bar and a wire rod is preferably defined at 0.20 or less at a position at a depth of ⅛ a steel product diameter from a surface thereof.

A rolling-direction-crystal-orientation RD//<334> fraction (area ratio) (hereinafter, simply referred to as "RD//<334> fraction") is defined at 0.20 or less. This is because soft magnetic properties are reduced at a RD//<334> fraction exceeding 0.2. The RD//<334> fraction is more preferably 0.10 or less, and further preferably 0.05 or less.

The RD//<334> fraction is calculated according to the following procedure. Specifically, the RD//<334> fraction is obtained by measuring at least one field of view at 200-fold magnification at a ⅛-depth-position, which is located between a surface of the bar-shaped steel product and a position at a depth of ¼ a diameter of the bar-shaped steel product, in an L-cross section of the steel product (i.e., a cross section parallel to a longitudinal direction of the steel product). A crystal orientation of each crystal grain in the observed field(s) of view is analyzed using FE-SEM/EBSD. A rolling direction is represented by RD. A crystal plane in the RD direction is analyzed. Components in a <334> orientation only in a clearance of 10 degrees or less are displayed and the RD//<334> fraction is measured. Specifically, the rolling-direction-crystal-orientation RD//<334> fraction means an area ratio of crystal having 10 degrees or less of an orientation difference between the <334> orientation and the rolling direction (at a position at a depth of ⅛ the diameter of the steel product from the surface thereof).

3. Chemical Composition

Reasons for limiting elements are as follows. It should be noted that an indication "%" for a content of each element means "mass %" in the following description.

C: 0.001 to 0.030%

C increases strength of the steel product. For this reason, a C content is defined at 0.001% or more. However, an excessive C content deteriorates soft magnetic properties. For this reason, the C content is defined at 0.030% or less. The C content is preferably 0.020% or less, more preferably 0.015% or less, and further preferably 0.010% or less.

Si: 0.01 to 4.00%

Si is contained as a deoxidizing element to improve high-temperature oxidation properties and alternating current magnetic properties. For this reason, a Si content is defined at 0.01% or more, and preferably 0.10% or more. However, an excessive Si content deteriorates soft magnetic properties. For this reason, the Si content is defined at 4.00% or less. The Si content is preferably 3.00% or less, and more preferably 1.50% or less.

Mn: 0.01 to 2.00%

Mn improves strength of the steel product and alternating current magnetic properties. For this reason, an Mn content is defined at 0.01% or more, and preferably 0.05% or more. However, an excessive Mn content reduces soft magnetic properties. Further, corrosion resistance may be decreased. For this reason, the Mn content is defined at 2.00% or less. The Mn content is preferably 1.00% or less, and more preferably 0.50% or less.

Ni: 0.01 to 4.00%

Ni improves toughness of the steel product. For this reason, an Ni content is defined at 0.01% or more, and preferably 0.05% or more. However, an excessive Ni content reduces soft magnetic properties. For this reason, the Ni content is defined at 4.00% or less. The Ni content is preferably 3.00% or less, more preferably 1.00% or less, and further preferably 0.50% or less.

Cr: 6.0 to 35.0%

Cr improves corrosion resistance and alternating current magnetic properties. For this reason, a Cr content is defined at 6.0% or more. The Cr content is preferably 7.0% or more, and more preferably 10.0% or more. However, an excessive Cr content reduces soft magnetic properties. The Cr content is thus defined at 35.0% or less. The Cr content is preferably 21.0% or less, and more preferably 20.0% or less.

Mo: 0.01 to 5.00%

Mo improves corrosion resistance and alternating current magnetic properties. For this reason, the Mo content is defined at 0.01% or more. However, an excessive Mo content reduces soft magnetic properties. For this reason, the Mo content is defined at 5.00% or less. The Mo content is preferably 3.00% or less, more preferably 2.00% or less, and further preferably 1.50% or less.

Cu: 0.01 to 2.00%

Cu improves corrosion resistance and alternating current magnetic properties. For this reason, a Cu content is defined at 0.01% or more, and preferably 0.05% or more. However, an excessive Cu content reduces soft magnetic properties. For this reason, the Cu content is defined at 2.00% or less. The Cu content is preferably 1.00% or less, more preferably 0.80% or less, and further preferably 0.40% or less.

N: 0.001 to 0.050%

N increases strength of the steel product. For this reason, an N content is defined at 0.001% or more, and preferably 0.002% or more. However, an excessive N content reduces soft magnetic properties. For this reason, the N content is defined at 0.050% or less. The N content is preferably 0.040% or less, more preferably 0.020% or less, and further preferably 0.010% or less.

A bar-shaped steel product of the invention may contain at least one element selected from Ti, Nb, V, B, Al, W, Ga, Co, Sn, Sb, and Ta as needed, in addition to the aforementioned elements.

Ti: 0 to 2.00%

Ti has an effect of increasing strength of the steel product. Further, since Ti forms carbonitrides, formation of Cr carbides is inhibited to inhibit formation of Cr-deficient layers. As a result, Ti has an effect of preventing intergranular corrosion. In other words, since Ti has an effect of improving corrosion resistance, Ti may be contained as needed. Further, Ti enhances soft magnetic properties by fixing carbon and nitrogen through the formation of Ti carbonitrides.

However, an excessive Ti content reduces the soft magnetic properties. Further, coarse carbonitrides decrease toughness. For this reason, the Ti content is defined at 2.00% or less. The Ti content is preferably 1.00% or less, more preferably 0.50% or less, further preferably 0.50% or less, and still further preferably 0.25% or less. On the other hand, the Ti content is preferably 0.001% or more in order to obtain the aforementioned effects.

Nb: 0 to 2.00%

Nb has an effect of increasing strength of the steel product. Further, since Nb forms carbonitrides, formation of Cr carbides is inhibited to inhibit formation of Cr-deficient layers. As a result, Nb has an effect of preventing intergranular corrosion. In other words, since Nb is an effective element for improving corrosion resistance, Nb may be contained as needed. Further, Nb enhances soft magnetic properties by fixing carbon and nitrogen through the formation of Nb carbonitrides. However, an excessive Nb content reduces the soft magnetic properties. Further, coarse carbonitrides decrease toughness. For this reason, the Nb content is defined at 2.00% or less. The Nb content is preferably 1.00% or less, more preferably 0.80% or less, and further preferably 0.60% or less. On the other hand, the Nb content is preferably 0.001% or more in order to obtain the aforementioned effects.

V: 0 to 2.0%

Since V has an effect of improving corrosion resistance, V may be contained as needed. However, an excessive V content reduces soft magnetic properties. Further, coarse carbonitrides decrease toughness. For this reason, the V content is defined at 2.0% or less. The V content is preferably 1.0% or less, more preferably 0.5% or less, and further preferably 0.1% or less. On the other hand, the V content is preferably 0.001% or more in order to obtain the aforementioned effects.

B: 0 to 0.1%

B has effects of improving hot workability and corrosion resistance. Accordingly, B may be contained as needed. However, an excessive B content reduces soft magnetic properties. For this reason, the B content is defined at 0.1% or less. The B content is preferably 0.02% or less, and more preferably 0.01% or less. On the other hand, the B content is preferably 0.0001% or more in order to obtain the aforementioned effects.

Al: 0 to 7.000%

Since Al has an effect of promoting deoxidation to improve a cleanliness level of inclusions, Al may be contained as needed. Further, addition of Al enhances alternating current magnetic properties. However, an excessive Al content saturates this effect and reduces soft magnetic properties. Further, coarse inclusions decrease toughness. For this reason, the Al content is defined at 7.000% or less. The Al content is preferably 3.000% or less, more preferably 0.100% or less, and further preferably 0.020% or less. On the other hand, the Al content is preferably 0.001% or more in order to obtain the aforementioned effects.

W: 0 to 3.0%

Since W has an effect of improving corrosion resistance, W may be contained as needed. However, an excessive W content reduces soft magnetic properties. Further, coarse carbonitrides decrease toughness. For this reason, the W content is defined at 3.0% or less. The W content is preferably 2.0% or less, and more preferably 1.5% or less. On the other hand, in order to obtain the aforementioned effects, the W content is preferably 0.05% or more, and more preferably 0.10% or more.

Ga: 0 to 0.05%

Since Ga has an effect of improving corrosion resistance, Ga may be contained as needed. However, an excessive Ga content decreases hot workability. Accordingly, the Ga content is defined at 0.05% or less. On the other hand, the Ga content is preferably 0.0004% or more in order to obtain the aforementioned effects.

Co: 0 to 2.50%

Since Co has an effect of improving strength of the steel product, Co may be contained as needed. Further, a moderate amount of Co enhances a saturated magnetic flux density, resulting in the improvement in soft magnetic properties. However, an excessive Co content reduces the soft magnetic properties. For this reason, the Co content is defined at 2.50% or less. The Co content is preferably 1.00% or less, and more preferably 0.80% or less. On the other hand, in order to obtain the aforementioned effects, the Co content is preferably 0.05% or more, and more preferably 0.10% or more.

Sn: 0 to 2.50%

Since Sn has effects of improving soft magnetic properties, corrosion resistance, and machinability, Sn may be contained as needed. However, an excessive Sn content reduces the soft magnetic properties. Further, toughness is decreased by grain boundary segregation of Sn. For this reason, the Sn content is defined at 2.50% or less. The Sn content is more preferably 1.00% or less, and further preferably 0.20% or less. On the other hand, in order to obtain the aforementioned effects, the Sn content is preferably 0.01% or more, and more preferably 0.05% or more.

Sb: 0 to 2.5%

Since Sb has an effect of improving corrosion resistance, Sb may be contained as needed. However, an excessive Sb content reduces soft magnetic properties. For this reason, the Sb content is defined at 2.5% or less. The Sb content is more preferably 1.0% or less, and further preferably 0.2% or less. On the other hand, in order to obtain the aforementioned effects, the Sb content is preferably 0.01% or more, and more preferably 0.05% or more.

Ta: 0 to 2.5%

Since Ta has an effect of improving corrosion resistance, Ta may be contained as needed. However, an excessive Ti content reduces soft magnetic properties. For this reason, the Ta content is defined at 2.5% or less. The Ta content is preferably 1.5% or less, and more preferably 0.9% or less. On the other hand, in order to obtain the aforementioned effects, the Ta content is preferably 0.01% or more, more preferably 0.04% or more, and further preferably 0.08% or more.

A bar-shaped steel product of the invention may contain at least one element selected from Ca, Mg, Zr, and REM as needed, in addition to the aforementioned elements.

Ca: 0 to 0.05%

Mg: 0 to 0.012%

Zr: 0 to 0.012%

REM: 0 to 0.05%

Ca, Mg, Zr, and REM may be contained for deoxidation, as needed. However, an excessive content of each of Ca, Mg, Zr, and REM reduces soft magnetic properties. Further, coarse inclusions decrease toughness. For this reason, Ca of 0.05% or less, Mg of 0.012% or less, Zr of 0.012% or less, and REM of 0.05% or less are defined. The Ca content is preferably 0.010% or less, and more preferably 0.005% or less. The Mg content is preferably 0.010% or less, and more preferably 0.005% or less. The Zr content is preferably 0.010% or less, and more preferably 0.005% or less. REM is preferably 0.010% or less.

On the other hand, in order to obtain the aforementioned effects, Ca of 0.0002% or more, Mg of 0.0002% or more, Zr of 0.0002% or more, and REM of 0.0002% or more are preferable. The Ca content is more preferably 0.0004% or more, and further preferably 0.001% or more. The Mg content is preferably 0.0004% or more, and further preferably 0.001% or more. The Zr content is more preferably 0.0004% or more, and further preferably 0.001% or more. The REM content is more preferably 0.0004% or more, and further preferably 0.001% or more.

It should be noted that REM is a general term for 17 elements including Y, Sc, and 15 elements of lanthanoids. One or more of the 17 elements can be contained in steel. The REM content means a total content of these elements.

A bar-shaped steel product of the invention may contain at least one element selected from Pb, Se, Te, Bi, S and P as needed, in addition to the aforementioned elements.

Pb: 0 to 0.30%

Se: 0 to 0.80%

Te: 0 to 0.30%

Bi: 0 to 0.50%

S: 0 to 0.50%

P: 0 to 0.30%

Pb, Se, Te, Bi, S and P may be contained for machinability, as needed. However, an excessive content of each of Pb, Se, Te, Bi, S and P reduces soft magnetic properties and toughness. For this reason, Pb of 0.30% or less, Se of 0.80% or less, Te of 0.30% or less, Bi of 0.50% or less, S of 0.50% or less, and P of 0.30% or less are defined. The Pb content is preferably 0.1% or less, and more preferably 0.05% or less. The Se content is preferably 0.1% or less, and more preferably 0.05% or less. The Te content is preferably 0.1% or less, and more preferably 0.05% or less. The Bi content is preferably 0.1% or less, and more preferably 0.05% or less. The S content is preferably 0.1% or less, and more preferably 0.05% or less. The P content is preferably 0.1% or less, and more preferably 0.05% or less.

On the other hand, in order to obtain the aforementioned effects, Pb of 0.0001% or more, Se of 0.0001% or more, Te of 0.0001% or more, Bi of 0.0001% or more, S of 0.0001% or more, and P of 0.0001% or more are preferable. The Pb content is more preferably 0.0004% or more, and further preferably 0.001% or more. The Se content is more preferably 0.0004% or more, and further preferably 0.001% or more. The Te content is more preferably 0.0004% or more, and further preferably 0.001% or more. The Bi content is more preferably 0.0004% or more, and further preferably 0.001% or more. The S content is more preferably 0.0001% or more, and further preferably 0.0002% or more. The P content is more preferably 0.0004% or more, and further preferably 0.001% or more.

F Value

F value: 20.0 or Less

An F value is obtained by Formula (a) below. The F value is an index showing whether the steel structure is close to a ferrite single phase in solidification or solution heat treatment. If the steel structure is close to the ferrite single phase, the number of columnar crystals in the cast steel increases. The RD//<100> fraction during skew hot rolling described later is thus increased, enhancing soft magnetic properties. When the F value exceeds 20.0, not only ferrite but also austenite and martensite are contained. This decreases the RD//<100> fraction as well as the soft magnetic properties. For this reason, the F value is defined at 20.0% or less. The F value is preferably 10.0 or less, preferably 0.0 or less, and more preferably −10.0 or less.

$$F\ \text{Value}=700C+800N+20Ni+10Cu+10Mn-6.2Cr-9.2Si-9.3Mo-74.4Ti-37.2Al-3.1Nb+63.2 \quad (a)$$

where symbols of elements in Formula (a) mean contents (mass %) of the respective elements in steel.

In a chemical composition of the steel product of the invention, a balance consists of Fe and impurities. The "impurities" herein mean substances in raw materials such as ore and scrap as well as constituents mixed in the manufacturing process due to various factors when the steel product is industrially manufactured, the substances and the constituents being allowable within a range that does not adversely affect the invention.

Examples of the impurities include O, Zn, and H. The impurities are preferably reduced, however, when being contained, O, Zn, and H are desirably 0.01% or less.

4. Manufacturing Method

A favorable manufacturing method of a bar-shaped stainless steel product according to the invention will be described. The bar-shaped stainless steel product according to the invention is stably obtainable according to, for instance, a manufacturing method below.

For the bar-shaped stainless steel product according to the invention, steel having the aforementioned chemical composition is melted, the melted steel is casted into a cast steel having a predetermined diameter, and then the cast steel is subjected to hot skew rolling or warm skew rolling as well as hot wire-rod rolling or warm wire-rod rolling. Subsequently, a solution treatment, pickling, secondary working, and heat treatment are performed as needed.

4-1. Skew Rolling Step

The heated cast steel is preferably subjected to hot working by using skew rolling. The hot working is not limited to the skew rolling. Any method of hot working going through the same or similar heat processing history is usable. For instance, blooming (breakdown) is usable as long as going through the same or similar heat processing history.

In the skew rolling, for instance, as disclosed in Patent Literature 4, three work rolls are arranged on respective roll shafts that are twisted and skewed in the same direction around a target material to be rolled, and each work roll revolves around the target material while rotating, whereby the target material is rolled into a spiral shape while advancing. Columnar crystals in the ferritic stainless steel are <100> oriented with respect to a steel product radius direction. The <100> of the columnar crystals can be oriented with respect to a rolling direction instead of the steel product radius direction by being subjected to the skew rolling. However, when the rolling time of skew rolling, during which the steel product is in contact with the three work rolls, is short, the <100> oriented with respect to the rolling direction forms randomly-oriented recrystallized grains not being <100> orientation through high-speed processing.

The rolling time of skew rolling thus changes the RD//<100> fraction. Further, the rolling time of skew rolling changes the RD//<334> fraction in a portion from a surface of the steel product to a position at a depth of ¼ a steel product diameter. For this reason, the rolling time of skew rolling affects soft magnetic properties. When the rolling time of skew rolling is less than 0.10 s, the RD//<100> fraction decreases and the RD//<334> fraction in the portion from the surface of the steel product to the position at a depth of ¼ the steel product diameter increases. The soft magnetic properties are thus reduced. For this reason, the rolling time of skew rolling is 0.10 s or more, preferably 1 s or more, more preferably 10 s or more, and further preferably 50 s or more. An overlong rolling time of skew rolling decreases productivity, and thus 200 s or less is preferable.

4-2. Heat Treatment Temperature for Steel Bar and Wire Rod

The steel bar and wire rod after hot rolling are preferably subjected to a heat treatment. The heat treatment temperature for the steel bar and wire rod changes the RD//<100> fraction, thus affecting soft magnetic properties. When the heat treatment temperature for the steel bar and wire rod exceeds 1400 degrees C., a nucleus of RD//<100> fails to grow, decreasing the RD//<100> fraction. This reduces the soft magnetic properties. For this reason, the heat treatment temperature for the steel bar and wire rod is 1400 degrees C. or less, and preferably 1300 degrees C. or less. The nucleus of RD//<100> fails to grow when the heat treatment temperature for the steel bar and wire rod is less than 500 degrees C. The heat treatment temperature for the steel bar and wire rod is thus 500 degrees C. or more. The heat treatment temperature for the steel bar and wire rod is preferably 600 degrees C. or more, more preferably 700 degrees C., and further preferably 800 degrees C. or more. The RD//<334> fraction is also affected by the heat treatment temperature for the steel bar and wire rod. Thus, a favorable range of the RD//<334> fraction can be determined by adjusting the heat treatment temperature for the steel bar and wire rod in a range from 500 to 1400 degrees C. together with any other manufacturing conditions.

4-3. Wire Drawing Rate

The steel bar and wire rod that have been heat-treated after hot rolling are preferably subjected to wire drawing to be formed into a steel wire. The wire drawing rate changes the RD//<100> fraction, thus affecting soft magnetic properties. When the wire drawing rate exceeds 50%, recrystallization is facilitated in a subsequent heat treatment to decrease the RD//<100> fraction. This reduces the soft magnetic properties. The wire drawing rate is thus 50% or less, preferably 30% or less, more preferably 15% or less, and further preferably 5% or less. At a wire drawing rate of less than 0.01%, a nucleus of RD//<100> fails to grow in a subsequent heat treatment. The wire drawing rate is thus 0.01% or more. The wire drawing rate (%) is a percentage obtained by dividing an amount of change in the cross-sectional area of the steel product before and after the wire drawing by the cross-sectional area before the wire drawing. The RD//<334> fraction is also affected by the wire drawing rate. Thus, a favorable range of the RD//<334> fraction can be determined by adjusting the wire drawing rate in a range from 0.01 to 50% together with any other manufacturing conditions.

4-4. Heat Treatment Temperature for Steel Wire

The steel wire after wire drawing is preferably subjected to a heat treatment. The heat treatment temperature for the steel wire changes the RD//<100> fraction, thus affecting soft magnetic properties. When the heat treatment temperature for the steel wire exceeds 1400 degrees C., a nucleus of RD//<100> fails to grow, decreasing the RD//<100> fraction. This reduces the soft magnetic properties. For this reason, the heat treatment temperature for the steel wire is 1400 degrees C. or less, and preferably 1300 degrees C. or less. The nucleus of RD//<100> fails to grow when the heat treatment temperature for the steel wire is less than 500 degrees C. The heat treatment temperature for the steel wire is thus 500 degrees C. or more. The heat treatment temperature for the steel wire is preferably 600 degrees C. or more, more preferably 700 degrees C., and further preferably 800 degrees C. or more. The RD//<334> fraction is also affected by the heat treatment temperature for the steel wire. Thus, a favorable range of the RD//<334> fraction can be determined by adjusting the heat treatment temperature for the steel wire in a range from 500 to 1400 degrees C. together with any other manufacturing conditions.

5. Electromagnetic Component

Examples of an electromagnetic component using the bar-shaped stainless steel product of the invention include a core and a connector of an injector and a solenoid valve. Since the bar-shaped steel product used as a material has excellent soft magnetic properties, effects of improvement in magnetic attractive force, reduction in a component diameter, and improvement in responsiveness can be provided.

The invention is more specifically described below by means of Examples, however, is not limited to these Examples.

Example 1

Steels having chemical compositions shown in Tables 1 and 2 were melted. AOD melting, which was an inexpensive melting process for stainless steel, was assumed for steel melting, where each steel was practically melted in a 100-kg vacuum melting furnace and cast into a cast steel with a diameter of 180 mm. Then, the cast steel was formed into a stainless steel bar or stainless wire rod with a diameter of 20.0 mm under manufacturing conditions below.

In Table 2 and Tables 4 to 6, the values of the chemical composition or the RD//<100> fraction falling out of the scope of the invention are underlined. In Tables 4 to 6, the values of magnetic properties falling out of a favorable range of the invention are underlined. In Tables 5 and 6, the values of manufacturing conditions falling out of a favorable range of the invention are underlined.

The conditions are described below. Specifically, the cast steel was heated and subjected to skew rolling for a rolling time of 3 s. Annealing and rolling were subsequently performed thereon to produce a steel bar or wire rod (bar-shaped steel product) with a diameter of 20.0 mm, and the heat treatment for the steel bar and wire rod was performed at 900 degrees C.

TABLE 1

| Classification | Steel type | Chemical composition (mass %) C | Si | Mn | Ni | Cr | Mo | Cu | N | Al | Nb | Ti | Others | F value | Remarks |
|---|---|---|---|---|---|---|---|---|---|---|---|---|---|---|---|
| Invention | A | 0.030 | 0.24 | 0.15 | 0.09 | 15.0 | 1.19 | 0.12 | 0.006 | 0.002 | 0.20 | 0.10 | | −20.5 | |
| | B | 0.001 | 0.74 | 0.18 | 0.09 | 11.5 | 0.31 | 0.14 | 0.009 | 0.013 | 0.47 | 0.18 | | −20.0 | |
| | C | 0.010 | 4.00 | 0.23 | 0.03 | 11.3 | 1.43 | 0.18 | 0.003 | 0.018 | 0.06 | 0.22 | | −60.2 | |
| | D | 0.007 | 0.28 | 2.00 | 0.06 | 19.9 | 0.10 | 0.24 | 0.008 | 0.007 | 0.37 | 0.21 | | −46.1 | |
| | E | 0.002 | 1.40 | 0.10 | 4.00 | 19.5 | 1.40 | 0.32 | 0.003 | 0.010 | 0.40 | 0.20 | | −12.1 | |
| | F | 0.007 | 0.47 | 0.13 | 0.08 | 35.0 | 1.34 | 0.36 | 0.003 | 0.015 | 0.31 | 0.01 | | −159.5 | |
| | G | 0.009 | 2.00 | 0.42 | 0.19 | 6.0 | 0.14 | 0.10 | 0.001 | 0.006 | 0.29 | 0.04 | | 18.3 | |
| | H | 0.006 | 0.15 | 0.03 | 0.07 | 14.8 | 5.00 | 0.25 | 0.009 | 0.017 | 0.30 | 0.13 | | −71.8 | |
| | I | 0.002 | 0.68 | 0.34 | 0.05 | 14.9 | 1.43 | 2.00 | 0.007 | 0.009 | 0.11 | 0.21 | | −33.5 | |
| | J | 0.007 | 0.85 | 0.24 | 0.42 | 19.0 | 0.77 | 0.38 | 0.050 | 0.004 | 0.23 | 0.02 | | −12.5 | |
| | K | 0.008 | 0.20 | 0.33 | 0.40 | 10.8 | 0.10 | 0.30 | 0.007 | 7.000 | 0.00 | 0.00 | | −241.7 | |
| | L | 0.008 | 0.22 | 0.38 | 0.50 | 14.0 | 0.65 | 0.25 | 0.008 | 0.010 | 2.00 | 0.11 | | −18.0 | |
| | M | 0.010 | 0.30 | 0.49 | 0.14 | 11.0 | 0.86 | 0.36 | 0.003 | 0.008 | 0.08 | 2.00 | | −145.0 | |
| | N | 0.003 | 0.24 | 0.43 | 0.37 | 11.8 | 1.33 | 0.29 | 0.002 | 0.013 | 0.07 | 0.19 | | −20.6 | |
| | O | 0.003 | 0.24 | 0.45 | 0.12 | 16.0 | 0.58 | 0.08 | 0.005 | 0.015 | 0.32 | 0.00 | | −31.5 | |
| | P | 0.008 | 0.48 | 0.05 | 0.17 | 10.7 | 1.14 | 0.34 | 0.002 | 0.018 | 0.04 | 0.09 | | −11.7 | |
| | Q | 0.018 | 0.09 | 1.90 | 0.90 | 21.0 | 1.00 | 0.81 | 0.029 | 0.100 | 0.82 | 0.00 | | −2.2 | |
| | R | 0.028 | 0.30 | 1.80 | 3.80 | 6.5 | 3.76 | 1.90 | 0.042 | 1.000 | 0.10 | 1.37 | | 11.8 | |
| | S | 0.029 | 1.00 | 1.90 | 3.90 | 6.0 | 2.30 | 1.90 | 0.044 | 0.200 | 0.20 | 1.94 | Co:1.5 | 14.3 | |
| | T | 0.008 | 0.38 | 0.29 | 0.36 | 15.0 | 1.05 | 0.18 | 0.004 | 0.002 | 0.12 | 0.14 | Sb:0.01 | −33.5 | |
| | U | 0.007 | 0.39 | 0.19 | 0.22 | 17.2 | 0.18 | 0.28 | 0.005 | 0.010 | 0.10 | 0.16 | Co:0.20 | −43.1 | |
| | V | 0.006 | 1.41 | 0.11 | 0.22 | 16.1 | 1.31 | 0.23 | 0.002 | 0.016 | 0.19 | 0.16 | Sn:0.10 | −60.5 | |
| | W | 0.006 | 1.12 | 0.12 | 0.31 | 16.0 | 0.94 | 0.02 | 0.009 | 0.016 | 0.36 | 0.06 | Pb:0.12 | −41.9 | |
| | X | 0.004 | 1.49 | 0.06 | 0.08 | 13.9 | 0.91 | 0.36 | 0.008 | 0.005 | 0.49 | 0.20 | V:0.1 | −46.2 | |
| | Y | 0.004 | 0.84 | 0.15 | 0.20 | 19.5 | 0.51 | 0.24 | 0.006 | 0.017 | 0.31 | 0.01 | B:0.01 | −56.7 | |
| | Z | 0.001 | 1.30 | 0.15 | 0.49 | 16.9 | 0.84 | 0.29 | 0.002 | 0.019 | 0.39 | 0.08 | Ca:0.01 | −52.8 | |

TABLE 2

| Classification | Steel type | Chemical composition (mass %) C | Si | Mn | Ni | Cr | Mo | Cu | N | Al | Nb | Ti | Others | F value | Remarks |
|---|---|---|---|---|---|---|---|---|---|---|---|---|---|---|---|
| Invention | A A | 0.005 | 1.39 | 0.50 | 0.17 | 18.2 | 1.10 | 0.24 | 0.002 | 0.011 | 0.01 | 0.22 | Co:0.06 | −73.5 | |
| | A B | 0.008 | 1.26 | 0.13 | 0.07 | 13.5 | 0.16 | 0.33 | 0.002 | 0.010 | 0.06 | 0.20 | Te:0.01 | −36.0 | |
| | A C | 0.002 | 0.34 | 0.47 | 0.15 | 13.5 | 0.87 | 0.33 | 0.008 | 0.004 | 0.53 | 0.09 | P:0.10 | −21.4 | |
| | A D | 0.004 | 0.35 | 0.01 | 0.09 | 19.9 | 0.17 | 0.14 | 0.008 | 0.019 | 0.05 | 0.04 | Se:0.001 | −56.4 | |
| | A E | 0.001 | 0.22 | 0.06 | 0.12 | 12.8 | 0.16 | 0.22 | 0.009 | 0.006 | 0.28 | 0.19 | Bi:0.001 | −22.3 | |
| | A F | 0.008 | 0.56 | 0.21 | 0.42 | 18.9 | 0.24 | 0.08 | 0.008 | 0.004 | 0.01 | 0.23 | Sn:0.03 | −55.7 | |
| | A G | 0.002 | 1.22 | 0.03 | 0.27 | 19.6 | 0.06 | 0.08 | 0.009 | 0.004 | 0.45 | 0.14 | W:0.08 | −67.6 | |
| | A H | 0.006 | 0.47 | 0.10 | 0.29 | 11.3 | 0.91 | 0.28 | 0.008 | 0.005 | 0.54 | 0.14 | Ta:0.07 | −11.7 | |
| | A I | 0.001 | 0.34 | 0.17 | 0.33 | 13.0 | 0.67 | 0.17 | 0.010 | 0.019 | 0.49 | 0.08 | Zr:0.007 | −16.3 | |
| | A J | 0.008 | 1.05 | 0.22 | 0.46 | 18.9 | 0.09 | 0.38 | 0.009 | 0.015 | 0.12 | 0.21 | Mg:0.008 | −52.7 | |
| | A K | 0.009 | 0.58 | 0.27 | 0.22 | 16.1 | 0.86 | 0.34 | 0.009 | 0.020 | 0.21 | 0.13 | REM:0.002 | −36.3 | |
| | A L | 0.005 | 0.76 | 0.04 | 0.16 | 12.9 | 0.83 | 0.28 | 0.006 | 0.016 | 0.37 | 0.13 | Ga:0.01 | −28.3 | |
| | A M | 0.007 | 1.42 | 0.42 | 0.21 | 18.6 | 1.49 | 0.29 | 0.010 | 0.002 | 0.58 | 0.05 | S:0.20 | −60.5 | |
| Product for comparison | A N | 0.050 | 2.10 | 0.31 | 0.70 | 17.6 | 1.71 | 0.76 | 0.015 | 0.052 | 0.65 | 0.47 | | −48.1 | |
| | A O | 0.0001 | 1.90 | 0.28 | 0.70 | 18.8 | 1.60 | 0.65 | 0.020 | 0.098 | 0.68 | 0.29 | | −74.3 | |
| | A P | 0.014 | 5.00 | 0.14 | 0.64 | 19.0 | 1.64 | 0.78 | 0.018 | 0.098 | 0.63 | 0.35 | | −101.4 | |
| | A Q | 0.012 | 1.88 | 3.00 | 0.57 | 11.3 | 1.97 | 0.76 | 0.014 | 0.027 | 0.80 | 0.36 | | −4.4 | |
| | A R | 0.015 | 1.77 | 0.01 | 5.00 | 20.0 | 1.75 | 0.64 | 0.017 | 0.074 | 0.65 | 0.25 | | 13.0 | |
| | A S | 0.013 | 2.67 | 0.35 | 0.61 | 40.0 | 1.97 | 0.73 | 0.019 | 0.065 | 0.77 | 0.41 | | −215.6 | |
| | A T | 0.015 | 3.00 | 0.32 | 0.98 | 3.0 | 1.88 | 0.77 | 0.011 | 0.200 | 0.64 | 0.34 | | 14.1 | |
| | A U | 0.011 | 1.79 | 0.16 | 0.93 | 19.1 | 6.00 | 0.61 | 0.014 | 0.087 | 0.74 | 0.25 | | −106.2 | |
| | A V | 0.012 | 1.79 | 0.36 | 0.85 | 13.7 | 1.51 | 3.00 | 0.014 | 0.099 | 0.62 | 0.26 | | −7.0 | |
| | A W | 0.011 | 2.86 | 0.02 | 0.81 | 15.0 | 1.96 | 0.41 | 0.100 | 0.024 | 0.63 | 0.27 | | 10.9 | |
| | A X | 0.014 | 2.18 | 0.49 | 0.58 | 19.9 | 1.97 | 0.54 | 0.0001 | 0.082 | 0.61 | 0.38 | | −100.0 | |
| | A Y | 0.014 | 2.74 | 0.28 | 0.63 | 17.7 | 1.61 | 0.62 | 0.013 | 8.000 | 0.67 | 0.44 | | −376.9 | |
| | A Z | 0.011 | 2.40 | 0.45 | 0.71 | 15.5 | 1.84 | 0.56 | 0.012 | 0.038 | 3.00 | 0.39 | | −70.4 | |
| | B A | 0.011 | 2.20 | 0.37 | 0.93 | 17.7 | 1.78 | 0.50 | 0.012 | 0.076 | 0.63 | 3.00 | | −267.1 | |
| | B B | 0.010 | 1.00 | 0.35 | 2.00 | 10.0 | 1.60 | 0.65 | 0.020 | 0.010 | 0.30 | 0.25 | | 30.2 | |

The RD//<100> fraction, RD//<334> fraction, and soft magnetic properties were measured for the obtained steel bars and wire rods (bar-shaped steel products). Results are collectively shown in Tables 3 and 4 below. The measurements were performed according to the following procedure.

TABLE 3

| Classification | No. | Steel type | RD// <100> fraction — | RD// <334> fraction — | DC magnetic properties @50e T | AC magnetic properties @100e−2 kHz T |
|---|---|---|---|---|---|---|
| Invention | 1 | A | 0.28 | 0.06 | 0.73 | 0.27 |
| | 2 | B | 0.27 | 0.08 | 0.79 | 0.21 |
| | 3 | C | 0.25 | 0.09 | 0.71 | 0.22 |
| | 4 | D | 0.27 | 0.08 | 0.58 | 0.21 |
| | 5 | E | 0.40 | 0.09 | 0.61 | 0.29 |
| | 6 | F | 0.33 | 0.10 | 0.58 | 0.26 |
| | 7 | G | 0.27 | 0.08 | 0.66 | 0.30 |
| | 8 | H | 0.37 | 0.07 | 0.64 | 0.27 |
| | 9 | I | 0.27 | 0.09 | 0.66 | 0.24 |
| | 10 | J | 0.24 | 0.05 | 0.67 | 0.23 |
| | 11 | K | 0.25 | 0.06 | 0.73 | 0.24 |
| | 12 | L | 0.35 | 0.07 | 0.67 | 0.21 |
| | 13 | M | 0.38 | 0.08 | 0.75 | 0.30 |
| | 14 | N | 0.57 | 0.02 | 1.21 | 0.74 |
| | 15 | O | 0.62 | 0.02 | 1.05 | 0.46 |
| | 16 | P | 0.70 | 0.05 | 1.20 | 0.80 |
| | 17 | Q | 0.15 | 0.07 | 0.41 | 0.15 |
| | 18 | R | 0.08 | 0.14 | 0.16 | 0.08 |
| | 19 | S | 0.07 | 0.19 | 0.15 | 0.07 |
| | 20 | T | 0.53 | 0.04 | 1.01 | 0.60 |
| | 21 | U | 0.43 | 0.02 | 0.85 | 0.40 |
| | 22 | V | 0.80 | 0.05 | 1.35 | 1.00 |
| | 23 | W | 0.38 | 0.03 | 0.65 | 0.28 |
| | 24 | X | 0.21 | 0.04 | 0.62 | 0.25 |
| | 25 | Y | 0.30 | 0.04 | 0.60 | 0.25 |
| | 26 | Z | 0.22 | 0.04 | 0.62 | 0.25 |

TABLE 4

| Classification | No. | Steel type | RD// <100> fraction — | RD// <334> fraction — | DC magnetic properties @50e T | AC magnetic properties @100e−2 kHz T |
|---|---|---|---|---|---|---|
| Invention | 27 | A A | 0.22 | 0.05 | 0.69 | 0.28 |
| | 28 | A B | 0.28 | 0.02 | 0.61 | 0.29 |
| | 29 | A C | 0.30 | 0.04 | 0.54 | 0.26 |
| | 30 | A D | 0.28 | 0.04 | 0.54 | 0.24 |
| | 31 | A E | 0.20 | 0.01 | 0.58 | 0.25 |
| | 32 | A F | 0.25 | 0.05 | 0.59 | 0.24 |
| | 33 | A G | 0.26 | 0.03 | 0.77 | 0.29 |
| | 34 | A H | 0.32 | 0.05 | 0.79 | 0.24 |
| | 35 | A I | 0.25 | 0.02 | 0.53 | 0.25 |
| | 36 | A J | 0.37 | 0.03 | 0.67 | 0.28 |
| | 37 | A K | 0.21 | 0.02 | 0.60 | 0.22 |
| | 38 | A L | 0.24 | 0.01 | 0.68 | 0.25 |
| | 39 | A M | 0.36 | 0.03 | 0.77 | 0.23 |
| Product for comparison | 40 | A N | 0.01 | 0.20 | 0.05 | 0.03 |
| | 41 | A O | 0.02 | 0.22 | 0.08 | 0.04 |
| | 42 | A P | 0.02 | 0.23 | 0.00 | 0.03 |
| | 43 | A Q | 0.02 | 0.24 | 0.01 | 0.03 |
| | 44 | A R | 0.03 | 0.28 | 0.08 | 0.01 |
| | 45 | A S | 0.03 | 0.20 | 0.08 | 0.03 |
| | 46 | A T | 0.04 | 0.26 | 0.07 | 0.03 |
| | 47 | A U | 0.02 | 0.22 | 0.09 | 0.02 |
| | 48 | A V | 0.02 | 0.29 | 0.09 | 0.04 |
| | 49 | A W | 0.03 | 0.28 | 0.02 | 0.03 |
| | 50 | A X | 0.01 | 0.26 | 0.04 | 0.02 |
| | 51 | A Y | 0.03 | 0.23 | 0.01 | 0.02 |
| | 52 | A Z | 0.02 | 0.25 | 0.06 | 0.04 |
| | 53 | B A | 0.02 | 0.25 | 0.05 | 0.01 |
| | 54 | B B | 0.03 | 0.26 | 0.01 | 0.03 |

The RD//<100> fraction was obtained by measuring at least one field of view at 200-fold magnification at each of a surface layer portion, a center portion, and a ¼-depth-position existing between the surface layer portion and the center portion in an L-cross section of a wire rod. A crystal orientation of each crystal grain in the observed field(s) of view was analyzed using FE-SEM/EBSD. The rolling direction was represented by RD. A crystal plane in the RD direction was analyzed. Components in a <001> orientation only in a clearance of 25 degrees or less (a crystal having 25 degrees or less of an orientation difference between the <100> orientation and the rolling direction) were displayed, and the RD//<100> fraction (area ratio (−)) (a mean of the surface layer portion, the center portion, and the ¼-depth-position) was measured.

The RD//<334> fraction was obtained by measuring at least one field of view at 200-fold magnification at a ⅛-depth-position, which was located between a surface of the wire rod and a position at a depth of ¼ the wire-rod diameter, in an L-cross section of the wire rod. A crystal orientation of each crystal grain in the observed field(s) of view was analyzed using FE-SEM/EBSD. The rolling direction was represented by RD. A crystal plane in the RD direction was analyzed.

Components in a <334> orientation only in a clearance of 10 degrees or less were displayed, and the RD//<334> fraction (area ratio (−)) (at a position at a depth of ⅛ the wire-rod diameter from the surface thereof) was measured.

A magnetic flux density (T) at 5 Oe was measured for direct current (DC) magnetic properties. A ring-shaped test piece with a 3 mm thickness×10 mm outer diameter×8 mm inner diameter was prepared, and the test piece was subjected to a heat treatment at 900 degrees C. for 2 hrs. Then, the magnetic flux density at 5 Oe was measured. A relationship between RD//<100> and magnetic properties was evaluated by processing the test piece such that the rolling direction was parallel to a diameter direction of the ring-shaped test piece. Test pieces prepared in a similar manner were sampled. A magnetic flux density of 0.1 T or more was evaluated as favorable.

A heat treatment at 900 degrees C. for 2 hrs was performed on the above ring-shaped test piece, and a maximum magnetic flux density (T) at 2 kHz and 10 Oe was measured for alternating current (AC) magnetic properties. A maximum magnetic flux density of 0.05 T or more was evaluated as favorable.

Nos. 1 to 39 satisfied the requirements of the invention, exhibiting favorable soft magnetic properties. Nos. 40 to 55 did not satisfy the requirements of the invention, exhibiting unfavorable soft magnetic properties.

Example 2

Subsequently, bar-shaped steel products with a diameter of 15 mm were prepared using a steel type Q shown in Table 1 under the conditions shown in Table 5. Any other history than the rolling time of skew rolling was the same as in Example 1. The RD//<100> fraction, RD//<334> fraction, and soft magnetic properties were measured for the prepared steel bars and wire rods (bar-shaped steel products) through the above methods. Results are collectively shown in Table 5 below.

TABLE 5

| Classification | No. | Steel type | Rolling time of skew rolling s | RD//<100> fraction — | RD//<334> fraction — | DC magnetic properties @50e T | AC magnetic properties @100e-2 kHz T |
|---|---|---|---|---|---|---|---|
| Invention | 109 | Q | 200.0 | 0.88 | 0.03 | 1.30 | 0.90 |
| | 110 | | 0.10 | 0.06 | 0.11 | 0.12 | 0.08 |
| | 111 | | 140 | 0.66 | 0.04 | 1.18 | 0.79 |
| | 112 | | 178 | 0.93 | 0.01 | 1.18 | 0.31 |
| | 113 | | 53 | 0.48 | 0.01 | 1.20 | 0.94 |
| | 114 | | 30 | 0.32 | 0.07 | 0.65 | 0.29 |
| | 115 | | 22 | 0.24 | 0.06 | 0.65 | 0.22 |
| | 116 | | 18 | 0.34 | 0.07 | 0.61 | 0.23 |
| | 117 | | 9 | 0.14 | 0.17 | 0.48 | 0.14 |
| | 118 | | 5 | 0.17 | 0.11 | 0.47 | 0.12 |
| | 119 | | 0.4 | 0.09 | 0.17 | 0.18 | 0.09 |
| | 120 | | 0.2 | 0.06 | 0.22 | 0.28 | 0.06 |
| Product for comparison | 121 | Q | 0.08 | 0.01 | 0.24 | 0.03 | 0.01 |
| | 122 | | 0.09 | 0.03 | 0.25 | 0.09 | 0.03 |
| | 123 | | 0.03 | 0.03 | 0.22 | 0.06 | 0.02 |

Nos. 109 to 120 satisfied the favorable requirements of the invention, exhibiting favorable soft magnetic properties. Nos. 121 to 123 did not satisfy the favorable requirements of the invention, exhibiting unfavorable soft magnetic properties.

Example 3

Subsequently, steel of a steel type P shown in Table 1 was used to prepare a cast steel. The prepared cast steel was heated and subjected to skew rolling for 50 s. Then, annealing and rolling were performed thereon to produce steel bars and wire rods with different diameters. Next, the heat treatment for the steel bar and wire rod, the wire drawing, and the heat treatment for the steel wire were performed under the conditions shown in Table 6 to prepare steel wires (bar-shaped steel products) with a diameter of 20 mm. The RD//<100> fraction, RD//<334> fraction, and soft magnetic properties were measured for the prepared steel wires (bar-shaped steel products) through the above methods. Results are collectively shown in Table 6 below.

Nos. 124 to 138 satisfied the favorable requirements of the invention, exhibiting favorable soft magnetic properties. Nos. 139 to 144 did not satisfy the favorable requirements of the invention, exhibiting unfavorable soft magnetic properties.

According to the invention, a bar-shaped steel product having excellent soft magnetic properties is obtainable and extremely useful in industry.

The invention claimed is:

1. A bar-shaped stainless steel product comprising a chemical composition comprising: by mass %, 0.001 to 0.030% of C, 0.01 to 4.00% of Si, 0.01 to 2.00% of Mn, 0.01 to 4.00% of Ni, 6.0 to 35.0% of Cr, 0.01 to 5.00% of Mo, 0.01 to 2.00% of Cu, 0.001 to 0.050% of N, 0 to 2.00% of Ti, 0 to 2.00% of Nb, 0 to 2.0% of V, 0 to 0.1% of B, 0 to 7.000% of Al, 0 to 3.0% of W, 0 to 0.05% of Ga, 0 to 2.5% of Co, 0 to 2.5% of Sn, 0 to 2.5% of Sb, 0 to 2.5% of Ta, 0 to 0.05% of Ca, 0 to 0.012% of Mg, 0 to 0.012% of Zr, 0 to 0.05% of REM, 0 to 0.30% of Pb, 0 to 0.80% of Se, 0 to 0.30% of Te, 0 to 0.50% of Bi, 0 to 0.50% of S, and 0 to 0.30% of P,

TABLE 6

| Classification | No. | Steel type | Heattreatment temperature for steel bar and wire rod ° C. | Wire drawing rate % | Heat treatment temperature for steel wire ° C. | RD//<100> fraction — | RD//<334> fraction — | DC magnetic properties @50e T | AC magnetic properties @100e-2 kHz T |
|---|---|---|---|---|---|---|---|---|---|
| Invention | 124 | P | 1400 | 9 | 785 | 0.39 | 0.10 | 0.56 | 0.26 |
| | 125 | | 500 | 15 | 738 | 0.23 | 0.06 | 0.70 | 0.27 |
| | 126 | | 713 | 50 | 789 | 0.40 | 0.09 | 0.66 | 0.22 |
| | 127 | | 700 | 0.01 | 794 | 0.34 | 0.06 | 0.53 | 0.25 |
| | 128 | | 763 | 11 | 1400 | 0.28 | 0.05 | 0.52 | 0.23 |
| | 129 | | 763 | 6 | 500 | 0.31 | 0.06 | 0.59 | 0.25 |
| | 130 | | 1275 | 0.3 | 1281 | 0.50 | 0.05 | 1.06 | 0.94 |
| | 131 | | 1136 | 1 | 1088 | 0.58 | 0.04 | 0.86 | 0.98 |
| | 132 | | 805 | 3 | 924 | 0.78 | 0.01 | 1.04 | 0.94 |
| | 133 | | 796 | 5 | 719 | 0.39 | 0.05 | 0.79 | 0.26 |
| | 134 | | 722 | 10 | 796 | 0.20 | 0.09 | 0.69 | 0.21 |
| | 135 | | 621 | 28 | 644 | 0.17 | 0.14 | 0.48 | 0.14 |
| | 136 | | 627 | 25 | 639 | 0.20 | 0.16 | 0.43 | 0.19 |
| | 137 | | 589 | 45 | 580 | 0.10 | 0.15 | 0.11 | 0.10 |
| | 138 | | 515 | 47 | 525 | 0.08 | 0.23 | 0.14 | 0.05 |
| Product for comparison | 139 | P | 1500 | 4 | 1052 | 0.02 | 0.25 | 0.05 | 0.03 |
| | 140 | | 400 | 0 | 1251 | 0.02 | 0.21 | 0.07 | 0.03 |
| | 141 | | 932 | 60 | 1274 | 0.02 | 0.25 | 0.06 | 0.03 |
| | 142 | | 820 | 0.001 | 1080 | 0.01 | 0.29 | 0.05 | 0.04 |
| | 143 | | 961 | 5 | 1500 | 0.01 | 0.26 | 0.08 | 0.02 |
| | 144 | | 1155 | 5 | 400 | 0.02 | 0.24 | 0.06 | 0.02 |

a balance consisting of Fe and impurities, an F value shown in Formula (a) below being 20 or less, a rolling-direction-crystal-orientation RD//<100> fraction of the bar-shaped stainless steel product being 0.05 or more, the rolling-direction-crystal-orientation RD//<100> fraction meaning an area ratio of crystal having 25 degrees or less of an orientation difference between a <100> orientation and a rolling direction, $$F\text{ value}=700C+800N+20Ni+10Cu+10Mn-6.2Cr-9.2Si-9.3Mo-74.4Ti-37.2Al-3.1Nb+63.2 \quad (a)$$

where symbols of elements in Formula (a) mean contents (mass %) of the respective elements in steel.

2. The bar-shaped stainless steel product according to claim 1, wherein in the chemical composition, by mass %, Si is 3.00% or less and Al is 3.000% or less, a rolling-direction-crystal-orientation RD//<334> fraction is 0.2 or less at a position having a depth of ⅛ a steel product diameter from a surface of the steel product, the rolling-direction-crystal-orientation RD//<334> fraction meaning an area ratio of crystal having 10 degrees or less of an orientation difference between a <334> orientation and a rolling direction, and the rolling-direction-crystal-orientation RD//<100> fraction is 0.62 or more.

3. The bar-shaped stainless steel product according to claim 1, wherein the chemical composition comprises, by mass %, at least one selected from 0.001 to 2.00% of Ti, 0.001 to 2.00% of Nb, 0.001 to 2.0% of V, 0.0001 to 0.1% of B, 0.001 to 3.000% of Al, 0.05 to 3.0% of W, 0.0004 to 0.05% of Ga, 0.05 to 2.5% of Co, 0.01 to 2.5% of Sn, 0.01 to 2.5% of Sb, and 0.01 to 2.5% of Ta.

4. The bar-shaped stainless steel product according to claim 1, wherein the chemical composition comprises, by mass %, at least one selected from 0.0002 to 0.05% of Ca, 0.0002 to 0.012% of Mg, 0.0002 to 0.012% of Zr, and 0.0002 to 0.05% of REM.

5. The bar-shaped stainless steel product according to claim 1, wherein the chemical composition comprises, by mass %, at least one selected from 0.0001 to 0.30% of Pb, 0.0001 to 0.80% of Se, 0.0001 to 0.30% of Te, 0.0001 to 0.50% of Bi, 0.0001 to 0.50% of S, and 0.0001 to 0.30% of P.

6. The bar-shaped stainless steel product according to claim 1, comprising a magnetic flux density of 0.10 T or more at 5 Oe.

7. The bar-shaped stainless steel product according to claim 1, comprising a maximum magnetic flux density of 0.05 T or more at 10 Oe and at an alternating current frequency of 2 kHz.

8. An electromagnetic component using the bar-shaped stainless steel product according to claim 1.

9. The bar-shaped stainless steel product according to claim 1, wherein the chemical composition comprises, by mass %, at least one selected from 0.001 to 2.00% of Ti, 0.001 to 2.00% of Nb, 0.001 to 2.0% of V, 0.0001 to 0.1% of B, 0.001 to 7.000% of Al, 0.05 to 3.0% of W, 0.0004 to 0.05% of Ga, 0.05 to 2.5% of Co, 0.01 to 2.5% of Sn, 0.01 to 2.5% of Sb, and 0.01 to 2.5% of Ta.

10. The bar-shaped stainless steel product according to claim 9, wherein the chemical composition comprises, by mass %, at least one selected from 0.0002 to 0.05% of Ca, 0.0002 to 0.012% of Mg, 0.0002 to 0.012% of Zr, and 0.0002 to 0.05% of REM.

11. The bar-shaped stainless steel product according to claim 9, wherein the chemical composition comprises, by mass %, at least one selected from 0.0001 to 0.30% of Pb, 0.0001 to 0.80% of Se, 0.0001 to 0.30% of Te, 0.0001 to 0.50% of Bi, 0.0001 to 0.50% of S, and 0.0001 to 0.30% of P.

* * * * *